US012222709B2

(12) United States Patent
Schulz et al.

(10) Patent No.: US 12,222,709 B2
(45) Date of Patent: Feb. 11, 2025

(54) INTENT-BASED AUTOMATION ENGINEERING METHOD

(71) Applicant: ABB Schweiz AG, Baden (CH)

(72) Inventors: Dirk Schulz, Meckenheim (DE); Raoul Jetley, Karnataka (IN)

(73) Assignee: ABB Schweiz AG, Baden (CH)

(*) Notice: Subject to any disclaimer, the term of this patent is extended or adjusted under 35 U.S.C. 154(b) by 521 days.

(21) Appl. No.: 17/462,017

(22) Filed: Aug. 31, 2021

(65) Prior Publication Data

US 2021/0397173 A1   Dec. 23, 2021

Related U.S. Application Data

(63) Continuation of application No. PCT/EP2020/056255, filed on Mar. 9, 2020.

(30) Foreign Application Priority Data

Mar. 8, 2019   (EP) .................................... 19161637

(51) Int. Cl.
  *G05B 19/418*   (2006.01)
(52) U.S. Cl.
  CPC ............ *G05B 19/41885* (2013.01); *G05B 2219/31368* (2013.01); *G05B 2219/42155* (2013.01)
(58) Field of Classification Search
  CPC .... G05B 19/41885; G05B 2219/31368; G05B 2219/42155
  See application file for complete search history.

(56) References Cited

U.S. PATENT DOCUMENTS 5,838,595 A   11/1998   Sullivan et al.
6,904,328 B2   6/2005   Rietman et al.
(Continued)

FOREIGN PATENT DOCUMENTS

GB   2409293 A   6/2005
JP   7-191737 A   7/1995
(Continued)

OTHER PUBLICATIONS

Horváth, László, and Imre J. Rudas. "Behavior and design intent based product modeling." Acta Polytechnica Hungarica 1.2 (2004): 17-34. (Year: 2004).*

(Continued)

*Primary Examiner* — Carlos R Ortiz Rodriguez
(74) *Attorney, Agent, or Firm* — Leydig, Voit & Mayer, Ltd.

(57) ABSTRACT

An intent-based automation engineering method for automation of a production process includes: receiving an intent model, correlating to process intent, including production process functions, constraints on measurable properties on the production process functions, and/or production process function sequences required for the production process, as a received intent model; receiving a process model, correlating to process knowledge including a production process behavior, as a received process model; determining a machine-readable production model linking the received intent model to the received process model as a provided production model; and determining a control strategy for controlling the production process dependent on the provided production model as a determined control strategy.

19 Claims, 2 Drawing Sheets

(56) References Cited

U.S. PATENT DOCUMENTS

| | | | |
|---|---|---|---|
| 2009/0204267 A1* | 8/2009 | Sustaeta | G06Q 10/04 700/36 |
| 2013/0173332 A1 | 7/2013 | Ho et al. | |
| 2015/0161520 A1 | 6/2015 | Kaushal et al. | |
| 2018/0239342 A1 | 8/2018 | Jeon et al. | |
| 2018/0299862 A1 | 10/2018 | Zhao et al. | |

FOREIGN PATENT DOCUMENTS

| | | | |
|---|---|---|---|
| JP | 4722461 B2 | 7/2011 | |
| JP | 2017-504872 A | 2/2017 | |
| WO | WO 2018009546 A1 | 1/2018 | |
| WO | WO 2019040076 A1 | 2/2019 | |

OTHER PUBLICATIONS

Andersson, Adam, and Jakob Sandström. "Theory-based design of a manual assembly line in a dynamic environment." (2016). (Year: 2016).*

Andrew Lerner, "Intent-based Networking," Feb. 2017, pp. 1-2, Gartner Inc., Stamford, CT, USA, Retrieved from the Internet: URL:https://blogs.gartner.com/andrew-lerner/2017/02/07/intent-based-networking/.

M. Broy, "Declarative specification and declarative programming," Proceedings of the 6th International workshop on Software specification and design (IWSSD '91), pp. 1-10, Oct. 1991, IEEE Computer Society Press, Los Alamitos, CA, USA.

N. Halbwachs et al., "The synchronous data flow programming language LUSTRE," Proceedings of the IEEE, Sep. 1991, pp. 1305-1320, IEEE, Piscataway, NJ, USA.

P. Feiler et al., "A Requirement Specification Language for AADL," Jun. 2016, pp. 1-34, Software Engineering Institute, Pittsburgh, Pennsylvania, USA Retrieved from the Internet: URL:http://resources.sei.cmu.edu/library/asset-view.cfm?AssetID=464370.

Abb, "800xA APC—Advanced Process Control," Jan. 2014, pp. 1-6, ABB, Zurich, Switzerland Retrieved from the Internet: URL:https://new.abb.com/control-systems/system-800xa/800xa-dcs/embedded-systems/advanced-process-control.

Eduardo Gallestey et al., "800xA APC. Demystifying MPC: How to deploy it with 800xA," Jan. 2014, pp. 1-16, ABB, Zurich, Switzerland.

Eduardo Gallestey et al., "Advancing System 800xA. Demystifying MPC and how to deploy it with ABB's Extended Automation System 800xA," Jan. 2014, pp. 52-59, ABB, Zurich, Switzerland.

Japanese Patent Office, Office Action in Japanese Patent Application No. 2021-540560, 5 pp. (May 30, 2022).

* cited by examiner

INTENT-BASED AUTOMATION ENGINEERING METHOD

CROSS-REFERENCE TO PRIOR APPLICATION

This application is a continuation of International Patent Application No. PCT/EP2020/056255, filed on Mar. 9, 2020, which claims priority to European Patent Application No. EP 19161637.4, filed on Mar. 8, 2019. The entire disclosure of both applications is hereby incorporated by reference herein.

FIELD

The invention relates to an intent-based automation engineering method for automation of a production process as well as a device configured to execute such a method.

BACKGROUND

Automation engineering is about designing the behavior of the automation system to automatically control a particular production process to fulfil a production target according to technical and regulatory constraints. Today, this is done by describing the configuration data for the vendor- or technology-specific automation devices and subsystems like vendor-specific device parameters, fieldbus-specific settings, IEC 61131 control logic, etc. The requirements of the production process are thereby extracted from different types of process design documents like piping & instrumentation diagrams, signal tables, textual requirements, etc. These process design documents are in turn created based on the original knowledge and intent of the process expert, e.g. a chemical engineer. Turning these requirements into engineering data is done directly using dedicated engineering tools for devices, controllers, etc. or by using pre-configuring bulk import tools that generate these engineering data with the help of pre-defined templates. In all these cases, the engineering process is closely tied to the particular automation vendor portfolio and its technologies.

Process operation is about supervising and adjusting the automated control functions to fulfill operational targets like product quality, production volume, energy consumption, etc. Today, operators face tens or even hundreds of operator screens with thousands of indicators complemented by an alarm and event system to alert them about critical process conditions. While product KPIs such as purity of a chemical, thickness of paper, evenness of sheet metal can be measured and displayed, operational decisions cannot directly be inferred from these KPIs.

Today's automation engineering processes focus largely on the equipment level of a plant (pumps, mixers, tanks, reactors, heat exchangers, etc.) and how to control material flow through them. Behind this, there are often complex chemical reactions known in great detail to the chemical or process engineers. However, part of this knowledge is not captured or is lost on the path from chemical lab to the automation engineering company, with intermediate parties like customer automation departments and EPCs acting as information barriers.

This becomes apparent once a plant is operational after initial start-up, which in itself can be challenging and is often the first priority for a customer even before production efficiency. In the early operational phase, operators have to get to know the real process, quality and performance issues are detected, their root-causes are analyzed, and operation strategies are formed. To run a process efficiently, in particular in view of product quality, throughput volume and delay, energy consumption, etc., process and production optimization solutions are added depending on the particular problems which occur. This is achieved in an iterative dialog between optimization experts within the automation engineering company and the chemical/process experts. The issues of lost information can also be seen considering the alarm and event systems in an operational plant. While it is a particular purpose of process alarms to alert operators of KPI-critical process conditions, creating a quality alarm system is only feasible with exactly that process knowledge which today is lost in the engineering process, and it means added cost which many customers initially do not want to pay. As a result, operators may face large amounts of alarms with often unclear suggested actions, so-called alarm floods, which diminishes their ability to react appropriately and operate the process efficiently also under non-standard conditions.

Only at this point, expert knowledge is captured that to a large degree already existed during the early planning stages of the process but which was not recorded in the exchange design and requirements documentation. In addition to the added delay, optimization algorithms may find needed information from within the process is not available because no sensors were planned, ordered, installed, and integrated for this purpose. Adding them deeper into the operational process equipment is often not economically feasible. Furthermore, there is little common language between chemical engineers and automation engineers besides equipment-centric P&ID diagrams or control narratives.

In conclusion, process optimization is not optional. While today, most customers initially prioritize time to market over production efficiency, it will become less and less feasible to postpone optimization to the operational phase and solve issues case-by-case when they occur.

As far as migrating an engineered automation solution is concerned, even standardized control logic in IEC 61131 or IEC 61499 cannot be moved between different generations of automation systems even from the same vendor without any adaptation.

SUMMARY

In an embodiment, the present invention provides an intent-based automation engineering method for automation of a production process, comprising: receiving an intent model, correlating to process intent, comprising production process functions, constraints on measurable properties on the production process functions, and/or production process function sequences required for the production process, as a received intent model; receiving a process model, correlating to process knowledge comprising a production process behavior, as a received process model; determining a machine-readable production model linking the received intent model to the received process model as a provided production model; and determining a control strategy for controlling the production process dependent on the provided production model as a determined control strategy.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an improved control of a production process. In an embodiment, the present invention provides a method as described herein. In an embodiment, the present invention provides a device as described herein.

Further preferred embodiments are also described herein.

According to the invention, an intent-based automation engineering method for automation of a production process comprises the steps:

receiving an intent model, correlating to process intent, comprising production process functions, constraints on measurable properties on the production process functions and/or production process function sequences required for the production process;

receiving a process model, correlating to process knowledge comprising a production process behaviour;

determining a machine-readable production model linking the received intent model to the received process model; and determining a control strategy for controlling the production process dependent on the provided production model.

The production process preferably comprises a sequence of continuous and/or discrete production steps. The production process comprises a physical production process, preferably relating to a physical material transformation, a digital production process, preferably relating to firmware tests, and/or a mixed production process, preferably relating to a calibration process between the physical production process and the digital production process. In a preferred embodiment, the continuous process steps relate to the physical production process. Preferably, the discrete process steps relate to the physical production process and/or the digital production process.

The process intent preferably relates to desired states to achieve in the production process, undesired states to avoid in the production process, properties of the production process input to achieve and/or properties of the production process input to achieve.

The term "constraints" relates to quantified objectives on measurable properties of the production process and/or the production product. For example, the constraint defines a maximum temperature, which is acceptable without the material to be transformed to be lost.

Preferably, the production process functions include process input and/or process output.

The production process behaviour preferably comprises a physical behaviour relating to a representation of laws of nature and/or a digital behaviour relating to designed software logic. For example, the physical behaviour defines that for every 1° C. below a certain temperature, the purity of the material decreases by 2%. For example, the digital behaviour defines how an LED has to be controlled in order to glow at a defined brightness level.

The control strategy also comprises an optimization strategy for the production process.

Preferably, the process model links the knowledge of the production process to production process functions, further preferably by evaluating an intent, or in other words a goal, of the production process related to the production process functions.

Preferably, the process intent and/or the process knowledge relates to automation engineering data.

Preferably, the intent model comprises automation engineering data, which are recorded using an intent-language. An intent-language formulates a quantifiable expectation on the behavior of one or more components of the production process, ideally together with a reason or negative impact on the production process or product, in other words statements about "what", "why" and/or "or else" are covered.

In an example with process/product focus the process intent relate to a "what"—statement, wherein a temperature in tank X may never exceed 70° C. for more than 1 min and an "or else"—statement, wherein otherwise the product will be lost".

In addition, the process knowledge of the process designer is captured by a process model.

In an example, the process knowledge relates to a statement, wherein for every 1° C. below 40° C. in tank X, which is the "what"-statement, product purity is decreased by 2%, which is the "or else"-statement, because the endogenic chemical reaction cannot take place so easily, which is the "why"-statement.

In another example, the process knowledge relates to a statement, wherein if the pH value in tank X falls below 5, which is the "what"-statement, there will be foaming in the next process step, which is the "or else"-statement.

In principle, the same approach can be taken with components of an automation system, where the method is executed.

In an example, the process knowledge relates to a statement, wherein for any device of type X, which is the "what"-statement, every 1° C. housing temperature above 50° C. decreases lifetime by 1 month, which is the "or else"-statement.

In another example, the process knowledge relates to a statement, wherein tank X must have an emergency outflow value with high reliability, which is the "what"-statement; high reliability functions must use physically independent infrastructure on control level, which is the "why"-statement. From this, it can be concluded that the needed valve must be connected by dedicated cabling, and the intent-system can hint that it should be considered to specify if redundant controllers should also be used in such a case.

Typical steps in production processes, in particular continuous production processes, include heating, cooling, mixing, pumping, resting, etc. These steps are driven by sensors, for example temperature transmitters, and actors, for example pumps. The corresponding measureable or configurable quantities like temperature, pressure, flow, level, concentration, etc. can be referred to. The same holds for product-specific quality indicators to trace product quality to the automation design.

Preferably, the control strategy is determined dependent on at least one provided key performance indicator.

Preferably, a potential root causes for insufficient product quality of the production process can be collected from the production model. This supports root cause analysis and allows operating the production process closer to the needed target.

For example, if a lower product purity is sufficient to fulfill a customer order, energy to heat parts of the production process could be saved.

Preferably, design and engineering data are generated. Thereby, one or more control languages such as IEC 61131 are selected and the selected control and operations strategy is mapped onto a control technology.

Preferably, download artefacts are auto created for a particular distributed control system, e.g. System 800xA with AC800M. Thereby, the code is partitioned for deployment, compiled and downloaded.

Preferably the process is operated top down from given KPI values. Thus, the control of the production process can be improved.

In a preferred embodiment of the present invention, the method comprises the step of determining the process model by abstracting the process knowledge.

The term "abstracting", as used herein, comprises converting individual, in particular machine-readable, expert statements on process knowledge, in other words process behavior, into an integrated process model, thereby preferably calculating energy and material balances.

The abstracting of the process knowledge can be automated or executed manually by a user.

Thus, the determination of the process model can be improved.

Preferably, the process knowledge has a high complexity and is abstracted onto a medium complexity, which is less complex than the high complexity.

High complexity of process knowledge preferably relates to first-principle models, for example, mass-balance and energy equations and/or problem specific statements.

The higher the complexity of the process knowledge, the better a control strategy of the production process can be determined. However, a high complexity of process knowledge leads to high resource costs of the production process, in particular in view of computational power. The high complexity process knowledge therefore is abstracted onto a medium complexity in order to save resources, while limiting the quality of the control strategy. However, generally, the save of resource costs exceeds the limitation of the control strategy.

Preferably, the process knowledge about the behavior of each step is required beyond the basic functions of the productions equipment, which is referred to as low complex process knowledge, and below complex, costly, and problem-specific first-principle models, which is referred to as high complexity process knowledge. Thus, a middle ground for example covering quantitative dependencies in reactions or impact of process connectivity on process stability, is determined relating to as medium complexity process knowledge.

Thus, it is possible to add process knowledge at any time and generate a better model without having to redevelop the model manually.

Therefore, a more efficient description of the process knowledge can be found.

Thus, the control of the production process can be improved.

In a preferred embodiment of the present invention, the method comprises the step of determining the machine-readable production model by extending the process model dependent on the intent model.

Therefore, an already existing process model can be extended based on the described method.

Thus, the control of the production process can be improved.

In a preferred embodiment of the present invention, the production model comprises data for maintaining and monitoring a steady state, data for maintaining and monitoring a particular state, data for maximizing stability of a control of the production process and/or data for understanding dynamic aspects of the production process.

Preferably, the dynamic aspects of the production process relate to non-steady states of the production process.

In a preferred embodiment of the present invention, the process knowledge is provided by a process expert or extracted from existing specifications, preferably from existing process design documents, further preferably using pattern recognition algorithms, natural language processing and/or AI-based classification.

The extraction is preferably based on machine learning and/or knowledge extraction techniques from Natural Language Processing. The control narratives are parsed and entities of interest are recognized from the parsed text. If the input is not in text-format, the text is extracted from control diagrams by parsing and Optical Symbol/Character Recognition.

Therefore, the process knowledge of the process model can be determined automatically.

Thus, the control of the production process can be improved.

In a preferred embodiment of the present invention, the production model is determined dependent on an automatic completion of statements, an automatic suggestion for typical process intent, an automatic suggestion for process-specific process intent, an automatic suggestion for refining and/or adding process intent to resolve unclarified and/or a consistency check.

Thus, the control of the production process can be improved.

In a preferred embodiment of the present invention, the intent model, the process model and/or the production model uses a dictionary of predetermined terms.

Preferably, the predetermined terms are meaningful terms such as temperature, lifetime, product, high/low reliability, etc., which are preferably used as placeholders. During generation of download artifacts for the automation devices, these terms can be replaced with specific names or addresses of data elements.

Thus, the control of the production process can be improved.

In a preferred embodiment of the present invention, the method comprises the step of determining the control strategy by extending an existing control strategy.

The existing control strategy preferably is a control strategy, which was not determined depending on intent-based engineering in accordance with the described method.

Thus, an already existing control strategy can be improved.

In a preferred embodiment of the present invention, the process model comprises quantitative dependencies in reactions and/or an impact of process connectivity on process stability, preferably comprising loops in material flow and sharing of material with other processes.

In a preferred embodiment of the present invention, the method comprises the step of validating and/or verifying the production model, preferably by virtual testing.

Preferably machine learning is used for the validation and/or verification process.

Preferably, the validation and/or verification is executed already at design time of the production process.

Validation preferably comprises high-level checking whether a specification is covering the intended behavior product, validating in particular the safety of given intent and objectives. This is achieved by maintain dedicated safety and product-specific quality intent for comparison, and restricting access particularly to safety-related model. Therefore, process designers cannot change them, and they cannot automatically re-configure.

Verification preferably comprises detail-level checking whether a design complies with specification.

Virtual testing preferably comprises running simulation models and comparing their behavior with the specification. To achieve sufficient coverage, representative scenarios need to be run using the models, initial conditions and/or disruptive events.

Thus, the control of the production process can be improved.

In a preferred embodiment of the present invention, the method comprises the steps of generating an alarm, if operating the production process violates the production model, where the alarm indicates a violated process intent and/or a violated process knowledge serving as an indicator of a root cause for the violation and preferably determining a suggested responding action on the alarm.

Preferably, a hierarchy of alarms is determined by aggregating alarm definitions according to common root cause to be able to hide and/or subordinate alarm messages during the production process.

Thus, the control of the production process can be improved.

In a preferred embodiment of the present invention, the method comprises the step of automatically generating a configuration for generating the alarm, wherein the alarm comprises the root-cause and/or the suggested responding action determined by tracing measured or simulated alarm triggers dependent on the process model, preferably an underlying behaviour of the process model and/or an alarm hiding strategy determined by correlating alarms originating in the same root-cause and prioritizing the alarms according to criticality or impact on production KPIs.

Preferably, the alarm is generated by an alarm system, relating to an automated alarm system for signalling an alarm and/or an event in view of the production process.

In a preferred embodiment of the present invention, the method comprises the step of determining an inverted process model and/or an inverted production model dependent on the process model and/or the production model, configured for determining operation setpoints based on received key performance indicators.

While the process model and/or the production model allow the simulation of the production process to determine key performance indicator values, the inverted process model and/or the inverted production model allow to receive key performance indicators and determine operation setpoints.

Operation setpoints are desired or target value for an essential variable, or process value of a system. Examples are the desired temperature within a reactor or the desired flow of input material into a reactor. The task of process control is to regulate the production process to fulfil these setpoints. Inherently, process control has no knowledge of the intent, in other words the reason/rationale, behind a setpoint value. This intent originates in production targets/KPIs, in other words what is wanted by operations, and process knowledge, in other words what is possible from a process perspective. For example, to run a plant with "maximum productivity", process behavior must be known to constrain the material input flow setpoint to a value that will still yield a product of sufficient quality.

Preferably, the method comprises the step of generating a computer program being configured for executing the control strategy.

Preferably, generating the computer program comprises generating program code, selecting predefined library code blocks, selecting process module or machine definitions, incorporating a suitable part of the control strategy and/or integrating generated and selected code.

In a preferred embodiment of the present invention, the method comprises the step of operating the production process based on the determined control strategy.

According to an aspect of the present invention, a device is provided, configured for executing a method, as described herein.

Preferably, a computer program is provided, comprising instructions which, when the program is executed by a computer, cause the computer to carry out the method, as described herein.

Preferably, a computer-readable data carrier is provided having stored there on the computer program, as described herein.

The reference symbols used in the drawings, and their meanings, are listed in summary form in the list of reference symbols. In principle, identical parts are provided with the same reference symbols in the figures.

Figure 1:
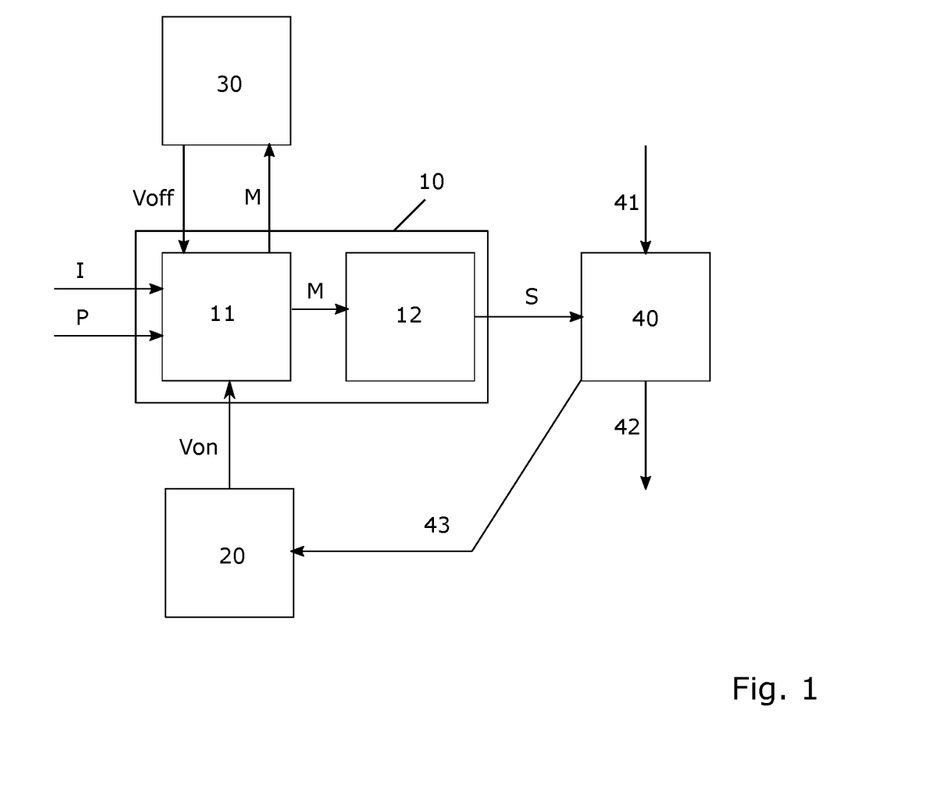
FIG. 1 schematically shows an automation system for executing an intent-based automation engineering method for automation of a production process.

FIG. 1 shows a system comprising a device 10, a machine learning unit 20, a simulation unit 30 and a production process module 40.

The device 10 comprises a model unit 11 and a control unit 12. The device 10 is provided with an intent model I and a process model P. The intent model I correlates to process intent, comprising production process functions, constraints on measurable properties on the production process functions and/or production process function sequences required for the production process. The process model P correlates to process knowledge comprising a production process behaviour. The model unit 11 determines a production model M linking the intent model I to the process model P.

Since the process intent therefore is integrated into the production model M the so called intent-based engineering allows designers and operators to focus on "what" the process should do, in other words the objectives, not "how" this is to be achieved, in other words the implementation. By hiding the complexity of automation technology, intent-based automation enables non-automation experts to efficiently automate and optimize their processes from an operational perspective. Furthermore, formalized objectives can become subject to automated validation, and they serve to improve coverage of automated.

The production model M is provided to the control unit 12, which determines a control strategy S for controlling the production process module 40. The production process module 40 itself is a physical module that is provided with input material 41 and processes the input material 41 to an output material 42. While processing, several measurement data 43, like the temperature, can be obtained from the production process module 40.

The measurement data 43 is provided to the machine learning unit 20, which verifies and/or validates the present production model M, thereby generating online validation data Von. These online validation data Von are provided back to the model unit 11, which then adjusts the present production model M based on the online validation data Von. Therefore, the production model M can be iteratively improved.

Additionally, the production model M is provided to the simulation unit 30. The simulation unit comprises a digital twin of the production process module 40 and verifies and/or validates the present production model M, thereby generating offline validation data Voff. The offline validation data Voff is also provided back to the model unit 11, which then adjusts the present production model M based on the offline validation data Voff. Therefore, the production model M can be iteratively improved.

Figure 2:
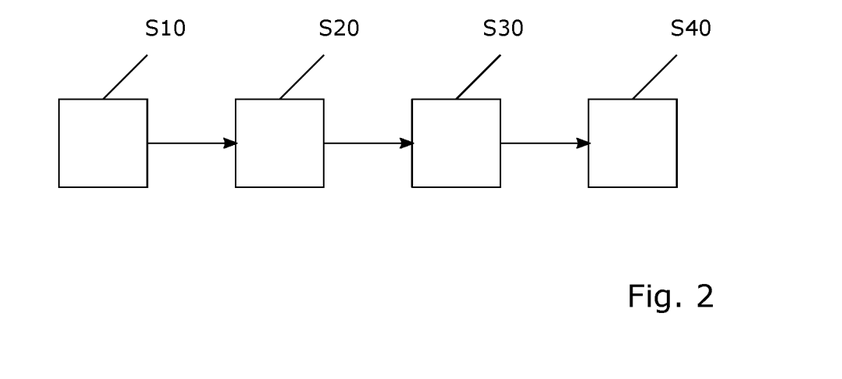
FIG. 2 schematically shows an intent-based automation engineering method for automation of a production process.

FIG. 2 shows a schematic view of Intent-based automation engineering method for automation of a production process. In step S10 an intent model, correlating to process intent, comprising production process functions, constraints on measurable properties on the production process functions and/or production process function sequences required for the production process, is received.

In step S20 a process model, correlating to process knowledge comprising a production process behaviour, is received.

In step S30 a machine-readable production model linking the received intent model to the received process model is determined.

In step S40 a control strategy for controlling the production process dependent on the provided production model is determined.

Preferably, the functional modules and/or the configuration mechanisms are implemented as programmed software modules or procedures, respectively; however, one skilled in the art will understand that the functional modules and/or the configuration mechanisms can be implemented fully or partially in hardware.

Figure 3:
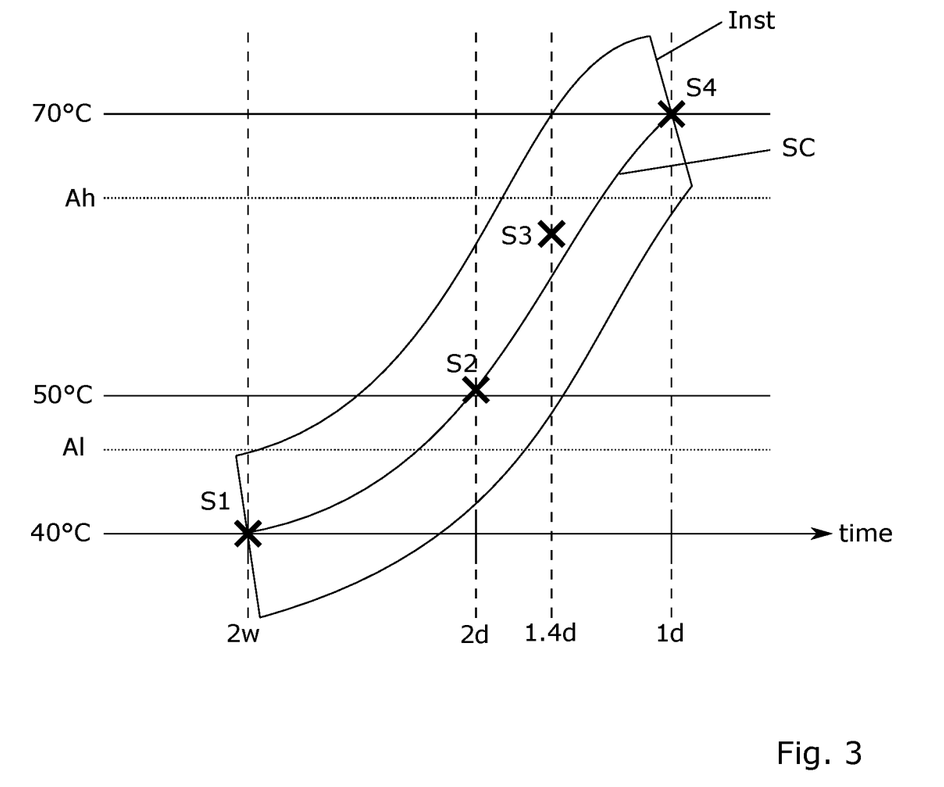
FIG. 3 schematically shows an example of a fermentation process.

FIG. 3 shows an example of a fermentation process. In the exemplary example, the production process module 40 is a fermentation tank.

The production process module 40 is supposed to be able to maintain a particular temperature and protect the fermentation process from overheating. This is achieved by describing causes and effects like opening a heating circuit if the temperature is too low or opening an emergency valve if it is too high. Encapsulating such basic equipment control and protection is the core feature of a production process module 40.

For the presumed fermentation process, the ideal temperature is 50° C., which is to be maintained for a duration of 2 days, see second setpoint S2. A corresponding production sequence can be generated to maintain this process step for two days, parameterizing mixing and heating services of the tank module to maintain 50° C., see setpoint S1.

To achieve acceptable quality of the fermented product, the process may never exceed 70° C. or fall below 40° C. In the first case, the used yeast fungus will die off and the batch must be discarded. In the second case, the fungus will become inactive and fermentation will stop as well. However, unlike for overheating, the process can be continued by raising the temperature again provided reaction was not stopped for more than 2 h, because then the product has started to deteriorate. The module is configured to protect the process according to these limits, overwriting the given defaults.

Within the allowed temperature range, fermentation speed is also changing with the specific temperature. For each +1° C., 1 h production time can be gained. With this knowledge, production volume can be scaled up without compromising product quality. This is indicated by a setpoint curve SC.

Lastly, relevant information from process topology is captured. The fermentation tank requires an external heat source, which is provided by a second module, a heat exchanger. However, the actual intention is not to achieve a specific temperature within the heat exchanger, which is what the heat exchanger can directly measure, but to achieve a specific temperature within the fermentation tank, which is aware of its temperature, but not in direct control of the heat exchange process. This leads to an instability of temperature control. This is indicated with an instability sector Inst. In consequence, knowing the rate at which fermentation time decreases with temperature is not enough to maximize production volume because at the edges of the good operating area, control instabilities will cause temperature to rise above the maximum allowed level and the batch will be lost. To be able to operate the process closer to its boundaries, temperature control must be stabilized e.g. by having the heat exchanger directly use the temperature measurement from the tank, but first of all, the impact that process connectivity has on control stability must be explicitly captured.

Traditional or modular engineering approach would have stated only the 50° C. setpoint and corresponding alarm limits, in particular a high alarm limit Ah and a low alarm limit Al. By combining the additional process knowledge in form of a process model P, which a process designer can easily capture on top of one or multiple modules, the production model M can be built that ties to process intent in form of the intent model I, such as production KPIs.

Without such optimization, the operating range of the process has to be determined by a series of trials and errors. This is typically done by operator and process expert collaborating during the early production phase following initial plant start-up because no offer codified information is available about the process behaviour.

Based on the production model M, the automation system knows out of the box that production time can be reduced by 30% without any risk for product quality even without stabilized control, see third setpoint S3, which does not lie on the setpoint curve SC due to instability. By also optimizing the stability of temperature control, production time can even be cut down safely to 50%, see fourth setpoint S4. Secondly, the operational strategy S can be motivated by tracing the automated decisions back to process knowledge provided by a process expert in the same company.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 10 device
11 model unit
12 control unit
20 machine learning unit
30 simulation unit
40 production process module
41 input material
42 output material
43 measurement data
Von online validation data
Voff offline validation data
I intent model
P process model
M production model
S control strategy
Ah high alarm limit
Al low alarm limit
S1 first setpoint
S2 second setpoint
S3 third setpoint
S4 fourth setpoint
SC setpoint curve
Inst instability sector
S10 receiving intent model
S20 receiving process model
S30 determining production model
S40 determining control strategy

What is claimed is:

1. An intent-based automation engineering method for automation of a production process, comprising:
receiving an intent model, correlating to process intent, comprising production process functions, constraints on measurable properties on the production process functions, and/or production process function sequences required for the production process, wherein the intent model comprises automation engineering data, which are recorded using an intent-language that formulates a quantifiable expectation on the behavior of one or more components of the production process;
receiving a process model, correlating to process knowledge comprising a production process behavior, wherein the process model comprises statements on a consequence of the production process behavior, wherein the process model is determined by abstracting the process knowledge, wherein the abstracting comprises converting individual machine-readable expert statements on process knowledge into the process model, and wherein the process knowledge is extracted from existing specifications using pattern recognition algorithms, natural language processing and/or AI-based classification;
determining a machine-readable production model linking the received intent model to the received process model, wherein the production model comprises data associated with maintaining and monitoring a state of the production process and represented at a lower degree of complexity than a degree of complexity of the received process model;
determining a control strategy for controlling the production process dependent on the provided production model; and
adjusting at least one production process step based on the control strategy.

2. The method of claim 1, further comprising:
determining the machine-readable production model by extending the process model dependent on the intent model.

3. The method of claim 1, wherein the data associated with maintaining and monitoring a state of the production process further comprises data for maintaining and monitoring a steady state, data for maintaining and monitoring a particular state, data for maximizing stability of a control of the production process, and/or data for understanding dynamic aspects of the production process.

4. The method of claim 1, wherein the process knowledge is additionally provided by a process expert.

5. The method of claim 1, wherein the production model is determined dependent on an automatic completion of statements, an automatic suggestion for typical process intent, an automatic suggestion for process-specific process intent, an automatic suggestion for refining and/or adding process intent to resolve unclarified and/or a consistency check.

6. The method of claim 1, wherein the intent model, the process model, and/or the production model uses a dictionary of predetermined terms.

7. The method of claim 1, further comprising:
determining the control strategy by extending an existing control strategy.

8. The method of claim 1, wherein the statements on a consequence of the production process behavior further comprises quantitative dependencies in reactions and/or an impact of process connectivity on process stability.

9. The method of claim 1, further comprising:
validating and/or verifying the production model.

10. The method of claim 1, further comprising:
generating an alarm if operating the production process violates the production model, the alarm indicating a violated process intent and/or a violated process knowledge and serving as an indicator of a root cause for the violation.

11. The method of claim 10, further comprising:
automatically generating a configuration for generating the alarm, the alarm comprising the root-cause and/or a suggested responding action determined by tracing measured or simulated alarm triggers dependent on the process model and/or an alarm hiding strategy determined by correlating alarms originating in a same root-cause and prioritizing the alarms according to criticality or impact on production KPIs.

12. The method of claim 1, further comprising:
determining an inverted process model and/or an inverted production model dependent on the process model and/or the production model, configured for determining operation setpoints.

13. The method of claim 1, further comprising:
operating the production process based on the determined control strategy.

14. A non-transitory computer-readable medium having processor-executable instructions stored thereon, wherein the processor-executable instructions, when executed by one or more controllers, facilitate the performance of the method of claim 1.

15. The method of claim 1, wherein the existing specifications comprise existing process design documents.

16. The method of claim 15, wherein the process knowledge is additionally provided by the process expert.

17. The method of claim 8, wherein the process model further comprises quantitative dependencies in reactions and/or the impact of process connectivity on process stability comprises loops in material flow and sharing of material with other processes.

18. The method of claim 9, further comprising:
   validating and/or verifying the production model by virtual testing.

19. The method of claim 10, further comprising:
   determining a suggested responding action based on the alarm.

* * * * *